United States Patent [19]

Lenahan et al.

[11] 4,416,111
[45] Nov. 22, 1983

[54] AIR MODULATION APPARATUS

[75] Inventors: Dean T. Lenahan; Robert J. Corsmeier, both of Cincinnati, Ohio; Albert P. Sterman, deceased, late of Cincinnati, Ohio, by Florence G. Sterman, executor

[73] Assignee: The United States of America as represented by the Administrator of the National Aeronautics and Space Administration, Washington, D.C.

[21] Appl. No.: 238,257

[22] Filed: Feb. 25, 1981

[51] Int. Cl.³ ............................................. F02C 7/18
[52] U.S. Cl. .................. 60/39.29; 60/39.83; 415/115
[58] Field of Search ............ 60/39.75, 39.83, 266, 60/39.23, 39.29; 415/115, 116, 117; 416/95

[56] References Cited

U.S. PATENT DOCUMENTS

| | | | |
|---|---|---|---|
| 2,811,833 | 11/1957 | Broffitt | 60/39.75 |
| 2,951,340 | 9/1960 | Howald | 60/39.75 |
| 3,020,718 | 2/1962 | Deacon et al. | 60/752 |
| 3,452,542 | 7/1969 | Saferstein et al. | 60/39.75 |
| 3,584,458 | 6/1971 | Wetzler | 60/39.75 |
| 3,663,118 | 5/1972 | Johnson | 415/116 |
| 3,791,758 | 2/1974 | Jenkinson | 415/116 |
| 3,826,084 | 7/1974 | Branstrom et al. | 416/95 |
| 3,936,215 | 2/1976 | Hoff | 415/116 |
| 3,966,354 | 6/1976 | Patterson | 415/116 |
| 3,972,181 | 8/1976 | Swayne | 60/39.66 |
| 4,113,406 | 9/1978 | Lee et al. | 415/115 |
| 4,178,129 | 12/1979 | Jenkinson | 416/95 |
| 4,217,755 | 8/1980 | Williams | 60/39.75 |
| 4,236,869 | 12/1980 | Laurello | 416/95 |
| 4,296,599 | 10/1981 | Adamson | 60/39.23 |

FOREIGN PATENT DOCUMENTS 712051 7/1954 United Kingdom .

OTHER PUBLICATIONS

"CF6-80 Engine Technical Review", vol. 1, Feb. 1979, General Electric Corp.

Primary Examiner—Carlton R. Croyle
Assistant Examiner—Jeffrey A. Simenauer
Attorney, Agent, or Firm—Norman T. Musial; John R. Manning

[57] ABSTRACT

An air modulation apparatus, such as for use in modulating cooling air to the turbine section of a gas turbine engine. The apparatus includes valve means disposed around an annular conduit, such as a nozzle, in the engine cooling air circuit. The valve means, when in a closed position, blocks a portion of the conduit, and thus reduces the amount and increases the velocity of cooling air flowing through the nozzle. The apparatus also includes actuation means, which can operate in response to predetermined engine conditions, for enabling opening and closing of the valve means.

21 Claims, 7 Drawing Figures

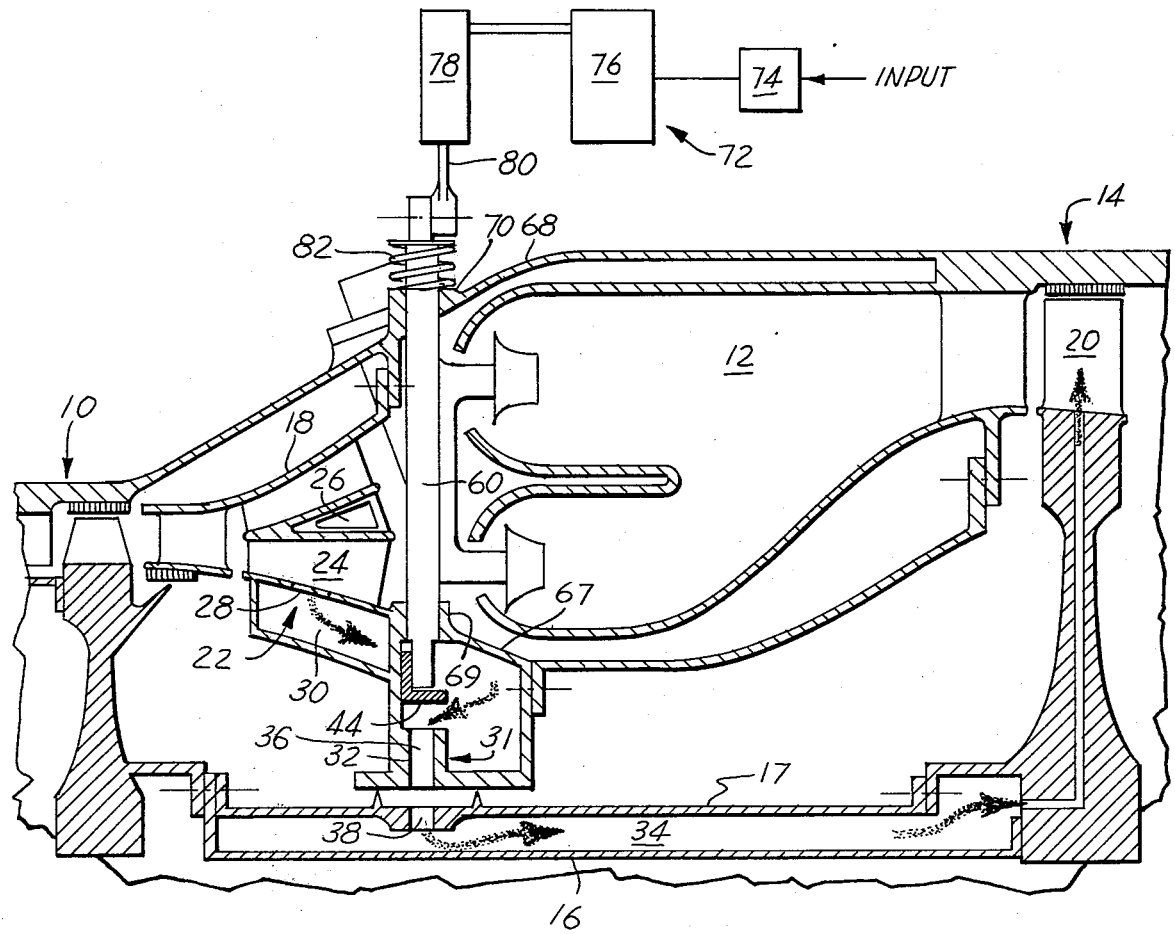
Fig 1
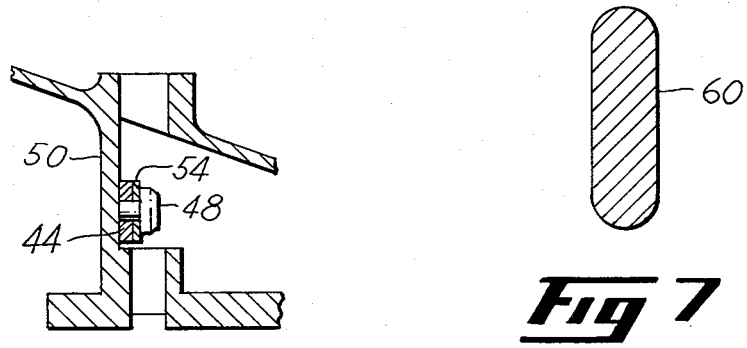
Fig 6
Fig 7

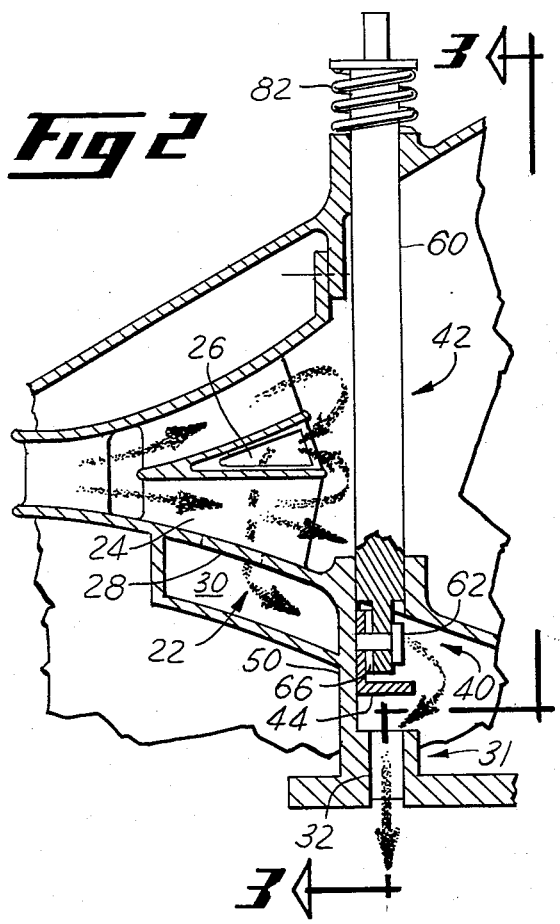
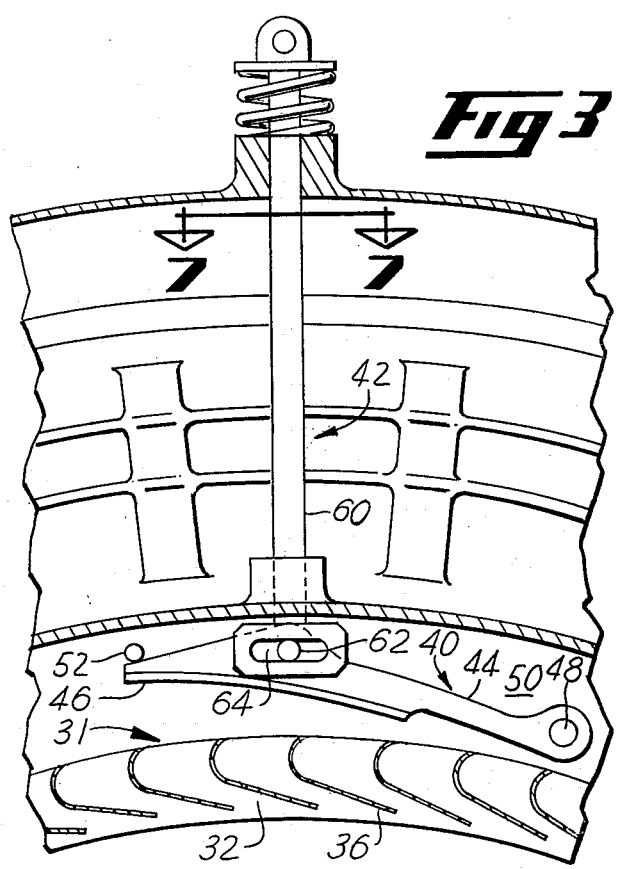
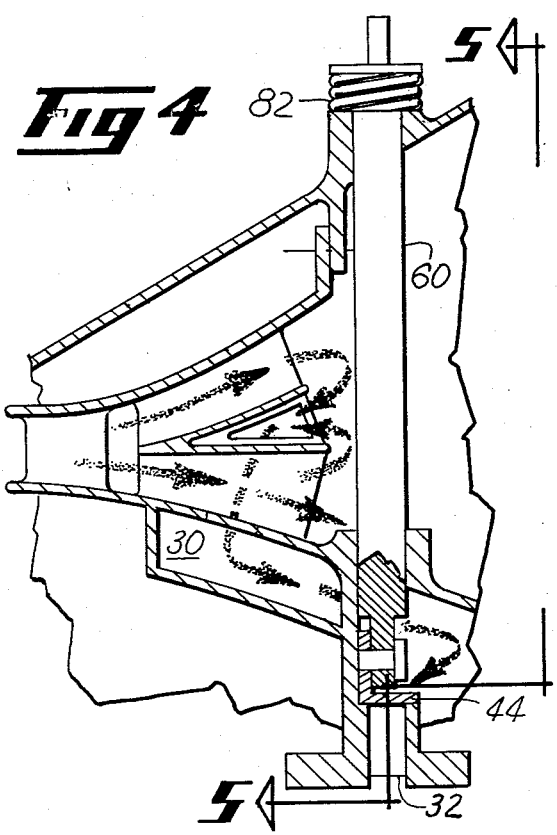
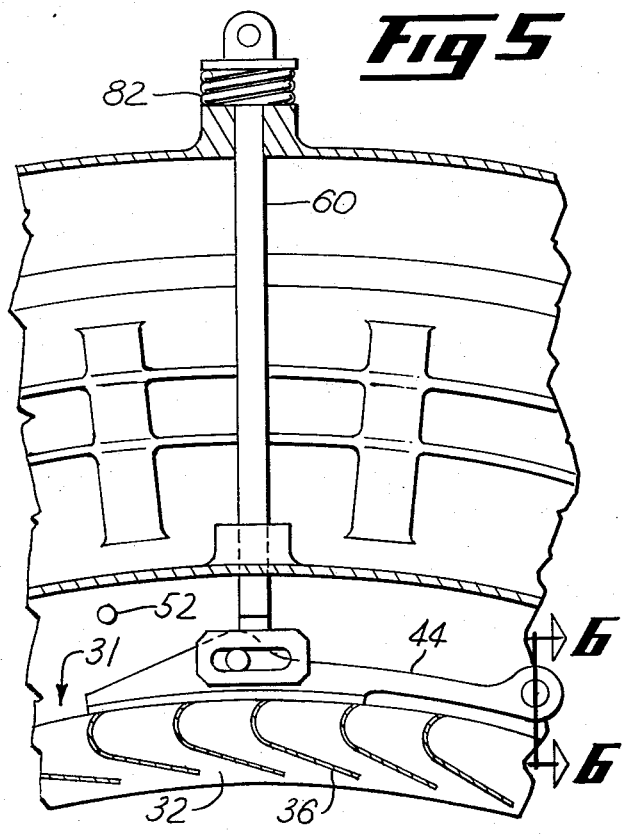

AIR MODULATION APPARATUS

The invention herein described was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention relates to gas turbine cooling and particularly to a new and improved air modulation apparatus which permits varying of the amount of air employed for engine cooling to thereby increase engine efficiency.

2. Description of the Prior Art

Many components within gas turbine engines must be cooled in order to maintain those components within acceptable temperature limits. The coolant often used is high pressure air extracted from the engine compressor. However, the remainder of the high pressure air from the compressor is needed for combustion within the engine combustor. The more high pressure air used for cooling, the less there is available to enter the combustor and to perform work in the turbine.

The coolant flow rate within most gas turbine engines is defined by the combustor exit gas temperature which will occur at the highest power setting. However, high power settings are used during only a small percentage of the engine operating time. Thus, engine components, such as the turbine, are adequately cooled during a small percentage of the time and are overcooled the rest of the time. As a result, some of the high pressure cooling air is wasted and the engine must therefore work harder to supply an adequate amount of high pressure air to the combustor. An unmodulated cooling arrangement thus reduces engine efficiency.

Previous air modulation arrangements, which vary the amount of cooling air to engine components, have improved engine efficiency. However, some problems remain. For example, some gas turbine engines employ cooling air circuits which utilize as part of the cooling circuit the channel circumferentially surrounding the rotor shaft which connects the turbine to the compressor. The engines also employ as part of the cooling circuit an annular nozzle, sometimes called a tangential flow accelerator, to introduce the cooling air into the circumferential channel surrounding the rotor shaft. The annular nozzle increases the velocity of the cooling air and turns it to flow in a direction of shaft rotation. Some of the energy of the cooling air invested by the compressor in the process of increasing the pressure of the air is extracted and converted into work by helping to rotate the shaft as the cooling air enters the rotor shaft.

In such previous air modulation arrangements, the cooling air is modulated upstream of the annular nozzle. When the amount of cooling air received by the annular nozzle is reduced, there is a corresponding reduction in the velocity of the cooling air and thus a reduction in the amount of work extracted from the air as it exits the annular nozzle. The turbine then must work harder to turn the shaft. This modulation arrangement can thus reduce engine efficiency.

In view of the above-mentioned problems, it is therefore an object of the present invention to improve the efficiency of gas turbine engines by reducing overcooling of engine components through use of an efficient cooling air modulation apparatus and thereby making available more high pressure air for combustion and turbine work.

Another object of the present invention is to increase engine efficiency by decreasing the ratio of coolant flow to combustor exit flow at operating conditions other than at maximum power setting.

Still another object of the present invention is to provide an air modulation apparatus in which, at a location within the cooling air circuit of a gas turbine engine, the velocity of and thus the work extracted from the cooling air increases as the amount of cooling air supplied to that location is decreased.

SUMMARY OF THE INVENTION

The present invention comprises an air modulation apparatus for use in gas turbine engines which include a cooling air circuit therein and a generally annular conduit within the circuit. The air modulation apparatus comprises valve means and actuation means. The valve means, when in a closed position, cover a portion of the conduit and thereby reduce the amount and increase the velocity of the cooling air exiting from the conduit. The actuation means opens and closes the valve means.

In a particular embodiment of the invention, the valve means comprise valve doors spaced at locations about the conduit and the actuation means comprise actuation arms attached with the valve doors. The actuation means can also include control means for effecting opening and closing of the valve doors in response to preselected engine operating conditions.

BRIEF DESCRIPTION OF THE DRAWING

This invention will be better understood from the following description taken in conjunction with the accompanying drawing, wherein:

FIG. 1 is a cross-sectional view of the upper half of a portion of a gas turbine engine incorporating features of the present invention.

FIG. 2 is a cross-sectional view of the air modulation aparatus with the valve door in the open position.

FIG. 3 is a cross-sectional view of the air modulation apparatus taken along lines 3—3 of FIG. 2.

FIG. 4 is a cross-sectional view of the air modulation apparatus with the valve door in the closed position.

FIG. 5 is a cross-sectional view of the air modulation apparatus taken along lines 5—5 of FIG. 4.

FIG. 6 is a cross-sectional view of the valve door where it is connected with the pivot pin taken along line 6—6 of FIG. 5.

FIG. 7 is a cross-sectional view of the actuation arm taken along line 7—7 of FIG. 3.

DESCRIPTION OF THE PREFERRED EMBODIMENT

Turning now to a consideration of the drawing, and in particular to FIG. 1, there is shown the upper half of a portion of a gas turbine engine. The portion shown includes the downstream portion of a compressor 10, a combustor 12, and the upstream portion of a turbine 14. The inner and outer shafts 16 and 17, respectively, are connected with each other and connect the turbine 14 to the compressor 10 such that rotation of the turbine causes rotation of the compressor. During engine operation, the compressor 10 increases the pressure of the air flowing through it. As the high pressure air exits the compressor 10, it flows through a diffuser 18 which decreases the velocity and further increases the pressure of the air. Some of the air which exits the diffuser 18 enters the combustor 12 where it is mixed with fuel and burned. The resulting gases exit the combustor 12 and flow across the blades 20 of the turbine 14 causing the turbine to rotate. Of course, the double annular combustor 12 and the split diffuser 18 as shown in FIG. 1 are for example only, and many other constructions of combustors and diffusers, are equally suitable for use with the present invention.

A portion of the air exiting the diffuser 18, however, is required to cool engine components. For example, the turbine 14, which is exposed to the hot gases flowing from the combustor 12 and which rotates at a high speed, requires such cooling air. The amount of cooling air required by the turbine 14, however, varies directly with the power setting of the engine. The higher the power setting, the hotter will be the combustor exit gases and the higher will be the rotational speed of the turbine. Consequently, a greater amount of cooling air is required. At lower power settings, a lesser amount of cooling air is required. The present invention comprises an efficient air modulation apparatus which can vary the amount of air which is directed to engine components, such as the rotor blades 20 of the turbine 14.

As can be seen in FIGS. 1 and 2, a portion of the high pressure air exiting the compressor 10 and the diffuser 18 flows through a cooling air circuit, indicated generally as 22. The cooling air circuit 22 can be defined in any appropriate manner within the engine. For example, in the arrangement shown in FIGS. 1 and 2, the upstream portion of the cooling air circuit 22 is defined by the hollow struts 24, which support the diffuser 18, and inlet and outlet holes 26 and 28, respectively, therein which permit the high pressure cooling air to flow into and out of the struts 24. The circuit is further defined by a supply cavity 30 which directs cooling air to a generally annular conduit 31. The conduit 31 can, for example, be an annular nozzle 32 which accelerates the cooling air exiting from the cooling air circuit 22. As will be described hereinafter, it is this conduit which can be partially covered so as to modulate the flow of air therethrough. Preferably, the conduit 31 receives the cooling air through openings in a generally radially outer portion thereof.

Referring to FIG. 1, after the cooling air exits the conduit 31, such as the nozzle 32, it cntinues to flow through the cooling air circuit 22 which terminates adjacent the engine component, such as the turbine 14, to which the cooling air is to be directed. A channel 34 which is defined between the inner and outer shafts 16 and 17 can comprise the downstream portion of the cooling air circuit 22. Since the shaft 16 and 17 are rotating during engine operation, the conduit 31 is appropriately constructed so as to not only reduce interference between the flow of cooling air and the rotation of the shafts but also to convert some of the energy of the cooling air into work to help rotate the shafts. For example, and as can be seen in FIG. 3, when the conduit 31 comprises a nozzle 32, it can include a plurality of vanes 36 which are shaped and arranged so as to define openings in the radially outer portion of the nozzle for receiving the cooling air and then accelerating the cooling air and discharging it in a direction generally tangential to the direction of rotation of the shafts. As can be seen in FIG. 1, the outer shaft 17 includes a plurality of holes 38 therethrough against the sides of which the cooling air impinges as it enters the channel 34 and thereby helps to rotate the shafts 16 and 17. It is to be understood that the above-described cooling air circuit 22 is presented only as an example and many other arrangements are suitable for use with the present invention.

Referring now to FIGS. 2 and 3, the air modulation apparatus of this invention comprises valve means, designated generally as 40, and actuation means, designated generally as 42. The valve means 40, when in a closed position, covers a portion of the conduit 31 and thereby reduces the amount of cooling air flowing through the conduit and thus through the cooling air circuit 22. Additionally, since the pressure of the cooling air flowing through the supply cavity 30 to the conduit 31 remains the same whether the valve means 40 is open or closed, when the valve means is closed, the velocity of the cooling air which does flow through and exits from the conduit 31 increases over what the velocity had been when the valve means was open. The actuation means 42 opens and closes the valve means 40.

The valve means 40 preferably comprises a plurality of valve doors 44 spaced at locations about the conduit 31. Each of the valve doors 44 includes an arcuate sealing surface 46 for abutting a portion of the annular conduit 31 to cover some of the openings in the conduit. When the openings are in the radially outer portion of the conduit 31, the valve doors are spaced about the circumference of the conduit and, when in the closed position, the arcuate surfaces abut the radially outer portion of the conduit.

The valve doors 44 preferably are hinged, such as by a pivot pin 48, to a generally radially extending flange 50 of the conduit 31. This arrangement permits the valve doors to open and close through a generally radially pivotal movement. As can be seen in FIG. 3, the flange 50 can include a stop pin 52 against which the valve door 44 abuts when it is in the open position and which therefore defines the limit of movement of the valve door. The stop pin 52 also helps damp vibration in the valve door 44 when they abut.

As can be seen in FIG. 6, additional vibration damping means for the valve door 44 is provided by a resilient member 54, such as a spring or a belleville washer, being disposed around the pivot pin 48 between the valve door 44 and the shoulder of the pivot pin.

Referring to FIGS. 2 and 3, the actuation means 42 preferably comprises a pluraltiy of radially movable actuation arms 60, each of the actuation arms being attached with one of the valve doors 44 to open and close the valve door. Each actuation arm 60 is connected with a valve door 44 by an actuation pin 62. The actuation pin 62 extends from the valve door 44 through an opening 64 near the radially inner end of the actuation arm. The opening 64 preferbly is elongated and thus permits the actuation pin 62 to slide transversely back and forth within the opening as the valve door 44 is opened and closed. This elongation of the opening 64 is necessary since the pivotal movement of the valve door 44 is not parallel to the radial movement of the actuation arm 60. As can be seen in FIG. 2, vibration damping means can be provided by a resilient member 66, such as a spring or belleville washer, being disposed around the actuation pin 62 between the valve door 44 and the actuation arm 60.

The actuation arms 60 are preferably shaped for reducing the pressure loss of air flowing across them. For example, as can be seen in FIG. 7, the actuation arm 60 can have a generally racetrack-shaped cross section with curved upstream and downstream ends.

As seen in FIG. 1, the inner and outer casings 67 and 68 respectively, through which the actuation arms 60 extend, can include bosses 69 and 70, respectively, surrounding the openings in the casings to provide a seal, support and bearing surfaces for the actuation arms.

The actuation means 42 can include control means, designated generally as 72. The radially outer end of each actuation arm 60 is connected with the control means 72 which effects radial movement of each of the actuation arms to open and close the valve doors 44. One example of such control means 72 is shown in FIG. 1. A controller 74 receives an input. For example, the input could be preselected engine operating conditions, such as turbine inlet temperature and fuel flow. Based on that input, the controller 74 sends a signal to one or a plurality of hydraulic pumps 76 which in turn ports fluid to a hydraulic actuator 78, one of which is associated with each actuation arm 60. The hydraulic actuator 78 is connected with the actuation arm 60 through a rod 80 such that when the hydraulic actuator 78 moves the rod 80, the actuation arm 60 also moves. Of course, many other arrangements of control means 72 can be successfully employed to effect movement of the actuation arm 60 and the arrangement described above is only an example. Additionally, for reaasons to be explained hereinafter, the valve doors 44 and their corresponding actuation arms 60 are arranged such that each valve door can be opened and closed independently of the other valve doors.

The air modulation apparatus also preferably includes fail safe means for opening the valve doors 44 in the event of predetermined conditions. As can be seen in FIG. 1, the fail safe means can comprise a resilient member 82, such as a spring, disposed around the radially outer end of the actuation arm 60. When the valve door 44 is closed, the resilient member 82 is in compression, as can be seen in FIG. 4. In the event of a predetermined condition, such as failure of the control means 72, for example by loss of hydraulic pressure in the hydraulic actuator 78, the resilient member 82 would return to its uncompressed condition and thereby would effect radially outward movement of the actuation arm 60, opening the valve door 44 to the position shown in FIG. 2.

The air modulation apparatus operates as follows. FIGS. 2 and 3 show the valve door 44 in the open position. There are preferably a plurality of such valve doors 44 spaced around the annular nozzle 32. When all of the valve doors are in the open position, the maximum amount of cooling air flows through the annular nozzle 32 to the component, such as the turbine 14, which receives the cooling air. The controller 74, shown in FIG. 1, which receives engine operating conditions as an input, maintains all of the valve doors in the open position during periods of high power operation when the temperatures are the highest and the greatest amount of cooling air is required.

As engine power is reduced to intermediate ranges, less cooling air is required by the turbine 14. The controller 74 receives inputs of the new engine operating conditions, such as reduced turbine inlet temperature and reduced fuel flow. The controller 74 sends a signal to one or several of the hydraulic pumps 76 to to close their valve doors 44 and thereby cover a portion of the annular nozzle 32 to reduce the amount of cooling airflow and increase the tangential velocity of the remaining cooling flow. FIGS. 4 and 5 show the valve doors 44 in the closed position. With less high pressure air being used for cooling, a greater amount is available to flow into the combustor 12 for combustion and turbine work. Thus the ratio of coolant flow to combustor exit flow is decreased and engine efficiency is thereby increased. Thus, in the intermediate power ranges, some of the valve doors 44 are open and some are closed.

Finally, at low power settings, the least amount of cooling air is required by the turbine 14. The controller 74 receives an input of lower engine operating conditions and sends a signal to the hydraulic pump 76 to close the remaining valve doors 44. Thus, at the lowest power settings, all of the valve doors 44 are closed. Cooling air flows through only those portions of the annular nozzle 32 which are not covered by the valve doors.

As engine power is increased, the controller 74 sends corresponding signals to the hydraulic pumps to open the valve doors 44 and thus increase the amount of cooling air to the turbine.

Engine efficiency is also increased by the air modulation apparatus being located adjacent the annular nozzle 32. As indicated earlier, work is extracted from the cooling air as it exits the nozzle 32 and impinges against the sides of the holes 38 in the outer shaft 17, thereby helping to rotate the shafts 16 and 17. Reference is made to FIGS. 4 and 5, where the valve doors 44 are shown closed. The amount and the pressure of the high pressure air in the supply cavity 30 up to the nozzle 32 remains the same whether the valve doors 44 are open or closed. Therefore, when the valve doors are closed, the velocity of cooling air flowing through the nozzle 32 increases over what it had been when the valve doors were open. The higher the velocity of the air, the more work it produces in helping to rotate the shafts 16 and 17. Thus, even though a lesser amount of air is flowing through the nozzle 32, its higher velocity allows more work to be extracted from it.

In prior air modulation arrangements in which the modulation of the cooling air was accomplished by valves located further upstream of the annular nozzle 32, the amount and pressure of the high pressure air in the supply cavity 30 up to the nozzle 32 would be lowered during the periods of reduced cooling flow. Thus, not only the amount of cooling air but also the velocity of that air flowing through the nozzle 32 would be reduced from what it was when the modulation valves were open.

Thus, the air modulation apparatus in the present invention, compared to prior arrangements, permits the same amount of cooling air to flow through the annular nozzle 32, but it flows at a higher velocity. More work can be extracted from the higher velocity air to help rotate the shaft 16 and thus the engine is more efficient.

In the event of a failure of the control means, such as a hydraulic failure, the resilient member 82 at the radially outer end of the actuation arm 60 acts as a fail safe means and effects movement of the actuation arm 60 to open its valve door 44, thus preventing potential overheating conditions.

It is to be understood that this invention is not limited to the particular embodiment disclosed, and it is intended to cover all modifications coming within the true spirit and scope of this invention as claimed.

What is claimed is:

1. In a gas turbine engine having a cooling air circuit therein for directing cooling air to an engine rotor component, an air modulation apparatus comprising:

(a) an annular nozzle including a plurality of circumferentially spaced vanes and a plurality of flow passages, each of said flow passages being disposed between and defined by adjacent ones of said vanes and each flow passage having an inlet and an outlet, each said inlet being effective for receiving a portion of said cooling air;

(b) valve means effective for covering only a portion of said nozzle to prevent flow to a first portion of said plurality of flow passages and thereby reducing the amount and increasing the velocity of cooling air exiting freely from a remaining portion of said plurality of flow passages of said nozzle not provided with valve means; and (c) actuation means for opening and closing said valve means.

2. The apparatus of claim 1 wherein said valve means includes an arcuate sealing surface for abutting a portion of said conduit.

3. The apparatus of claim 2 wherein said arcuate sealing surface abuts a radially outer portion of said nozzle when in a closed position.

4. The apparatus of claim 1 wherein said actuation means includes fail safe means for opening said valve means in the event of predetermined conditions.

5. The apparatus of claim 1 wherein said valve means comprises a plurality of valve doors spaced at locations about said nozzle.

6. The apparatus of claim 5 wherein said actuation means is effective for independently opening and closing said valve doors.

7. The apparatus of claim 3 wherein said valve doors are hinged for opening and closing through radially pivotal movement.

8. The apparatus of claim 7 wherein said actuation means comprise radially movable actuation arms attached with said valve doors.

9. The apparatus of claim 8 further including fail safe means comprising resilient members disposed around each of said actuation arms for effecting radial movement of said actuation arms to open said valve doors in the event of predetermined conditions.

10. The apparatus of claim 8 wherein said actuation arms have cross-sectional shapes elongated in a direction of air flowing across said actuation arms.

11. The apparatus of claim 8 wherein said nozzle includes a generally radially extending flange and said valve doors are hinged to said flange.

12. The apparatus of claim 8 wherein said valve doors and said actuation arms include vibration damping means.

13. The apparatus of claim 12 wherein said vibration damping means comprise a resilient member disposed between each of said actuation arms and the valve door to which the actuation arm is attached.

14. The apparatus of claim 8 wherein said actuation means include control means for effecting radial movement of each of said actuation arms in response to preselected engine operating conditions.

15. The apparatus of claim 14 wherein said control means is responsive to turbine inlet temperature and fuel flow.

16. An air modulation apparatus according to claim 1 wherein said nozzle comprises a tangential flow accelerator effective for accelerating and discharging said cooling air in a direction generally tangential to each said outlet.

17. An air modulation apparatus according to claim 1 wherein said inlets and outlets of said flow passages face in a generally radial direction.

18. An air modulation apparatus according to claim 17 wherein said inlets are disposed radially outwardly with respect to said outlets.

19. An air modulation apparatus according to claim 1 wherein said air modulation apparatus is effective for directing cooling air from a compressor to a turbine of said engine.

20. In a gas turbine engine having a cooling air circuit for directing cooling air from a compressor to a turbine within said engine, an air modulation apparatus comprising:

(a) an annular nozzle including a plurality of circumferentially spaced vanes and a plurality of flow passages, each of said flow passages being disposed between and defined by adjacent ones of said vanes and each flow passage having an inlet and an outlet, each said inlet being effective for receiving a portion of said cooling air;

(b) a plurality of valve doors spaced apart at locations about the circumference of said nozzle, each of said valve doors including an arcuate sealing surface for, when in a closed position, abutting a radially outer portion of said nozzle to prevent flow to a first portion of said plurality of flow passages and thereby reducing the amount and increasing the velocity of cooling air exiting freely from a remaining portion of said plurality of flow passages of said nozzle not provided with valve doors, said valve doors being hinged for opening and closing by radially pivotal movement;

(c) a plurality of radially movable actuation arms, each of said actuation arms being attached with one of said valve doors for opening and closing said valve doors;

(d) control means for effecting radial movement of each of said actuation arms in response to preselected engine operating conditions; and (e) a plurality of resilient members disposed around said actuation arms for effecting radial movement of said actuation arm to open said valve doors in the event of predetermined conditions.

21. An air modulation apparatus according to claim 20 further including:

first and second coaxially spaced shafts interconnecting said compressor and said turbine of said engine, said first shaft disposed radially outwardly of said second shaft and including a plurality of circumferentially spaced holes; and wherein said nozzle is effective for discharging cooling air from said outlets in a direction generally tangential to a direction of rotation of said first shaft and into said holes therein.

* * * * *